May 6, 1952   H. C. GRANT, JR., ET AL   2,595,246
DEVICE FOR TESTING ELECTRICAL CIRCUITS
Original Filed April 10, 1943   2 SHEETS—SHEET 1
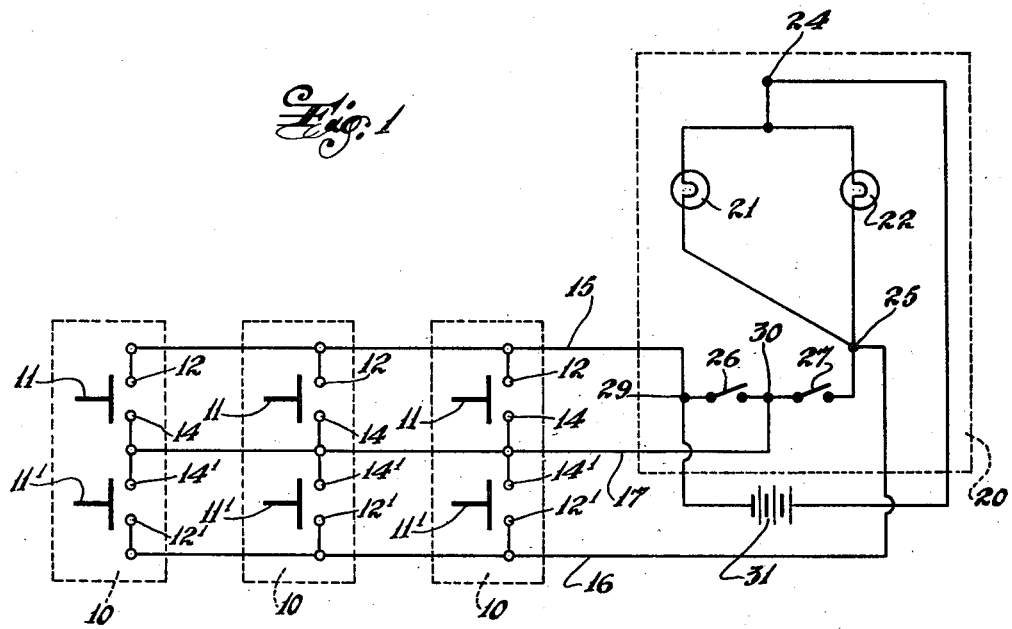
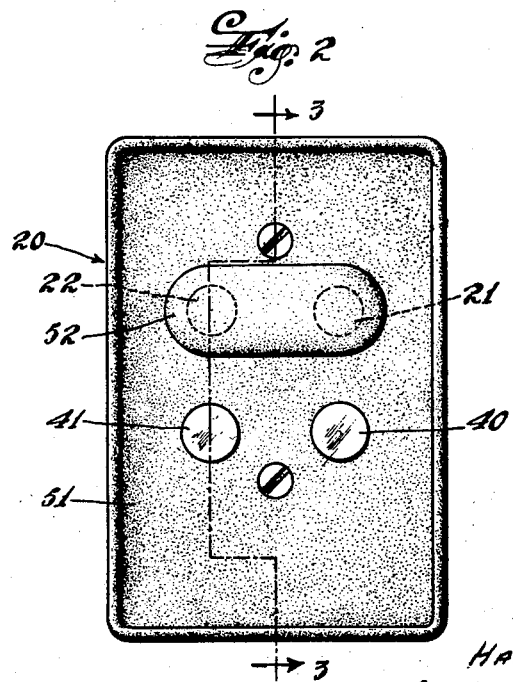
Inventor
HARRY C. GRANT, JR.
AND ARTHUR W. UHL
By J. William Carson
Attorney

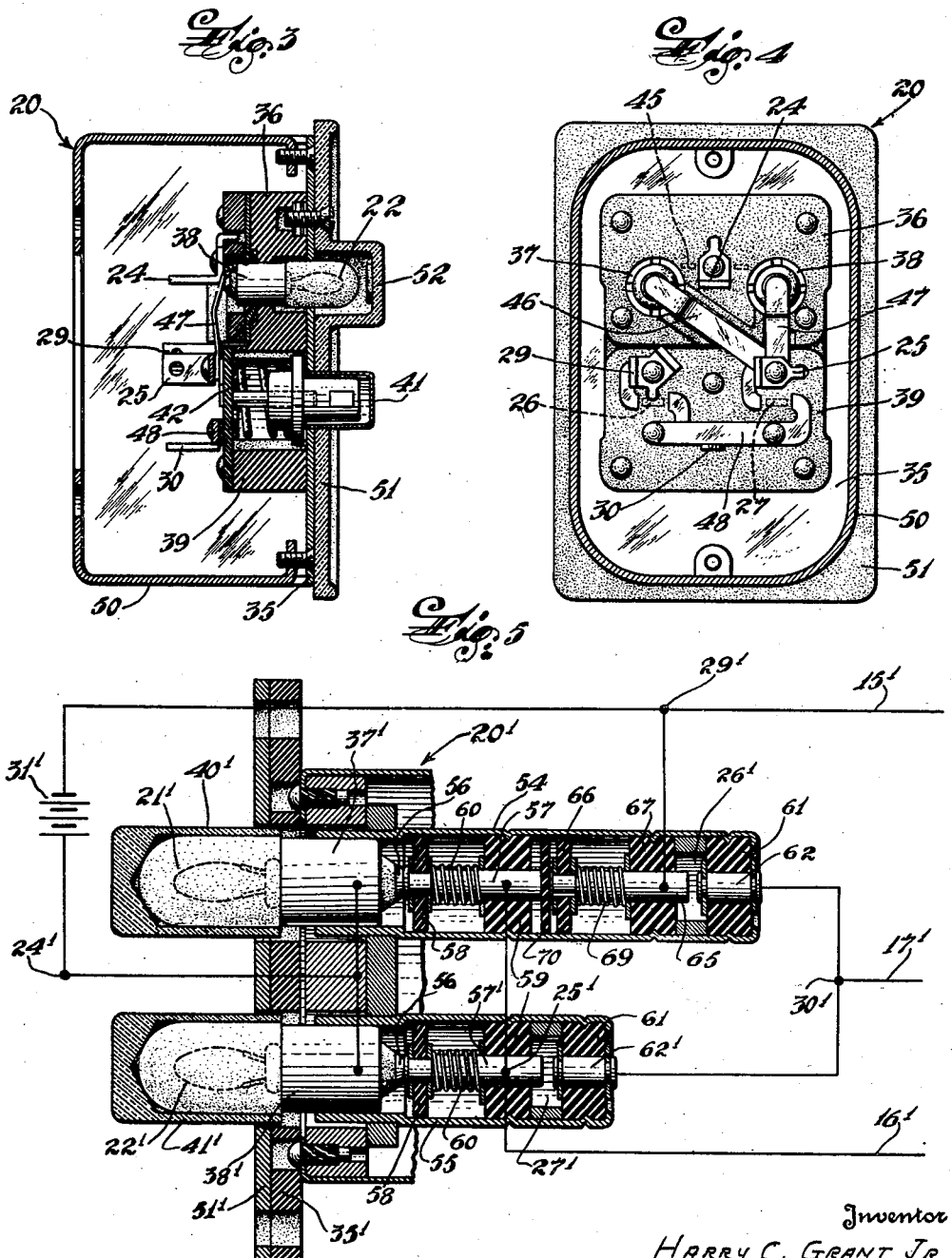

Patented May 6, 1952

2,595,246

UNITED STATES PATENT OFFICE 2,595,246

DEVICE FOR TESTING ELECTRICAL CIRCUITS

Harry C. Grant, Jr., Ridgewood, N. J., and Arthur W. Uhl, Inwood, N. Y., assignors to Specialties Development Corporation, Belleville, N. J., a corporation of New Jersey Original application April 10, 1943, Serial No. 482,572. Divided and this application January 27, 1948, Serial No. 4,636

5 Claims. (Cl. 177—329)

The present invention relates to a device for testing an electrical circuit to determine that it is in working order prior to the occurrence of an emergency.

This application is a division of our copending application Serial No. 482,572, filed April 10, 1943, now Patent No. 2,448,026, dated August 31, 1948.

More particularly, the invention relates to a device for testing a circuit having one or more detecting devices therein provided with circuit closing elements which are rendered effective in response to flame, predetermined high temperatures, or upon submersion of the devices in an electrically conductive liquid such as salt water. Such detecting devices may be installed in airplanes or other craft or vehicles and may be employed to effect operation of an alarm or signal indicating that a state of emergency exists. If desired, the circuit may be utilized, in addition, to effect operation of systems for combating the emergency. For example, in response to heat or flame, a fire extinguishing system may be operated; and, in response to submersion in salt water, suitable airplane flotation gear may be operated.

The present invention aims to provide a device for testing a detecting circuit of the foregoing character whereby to determine if any of the circuit closing elements are in circuit closing position or are short circuited. The invention further aims to provide a device for testing the circuit having indicating means which in turn may be tested.

Accordingly, an object of the invention is to provide a simple testing device which is readily connected in the circuit.

Another object is to provide a simple, compact device for testing the circuit, which may be installed on the dash board or control panel of a craft or vehicle.

Another object is to provide a circuit testing device having indicating means responsive to conditions of the circuit which are so wired in the circuit that they may be tested to determine whether or not they are in operating condition.

A further object consists in the combination of elements and arrangement of parts whereby the foregoing objects may be accomplished.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Figure 1 is a wiring diagram of an electrical circuit of the character to be tested by the device of the present invention.

Figure 2 is a front elevational view of a circuit testing device made in accordance with the invention.

Figure 3 is a sectional view taken substantially along the line 3—3 on Figure 2.

Figure 4 is a rear view of the device shown in Figures 2 and 3, a casing thereof being indicated in section to show interior parts in elevation.

Figure 5 is a sectional view of a circuit testing device illustrating a modified embodiment of the invention, together with a partial wiring diagram for the device.

Referring to the drawings, and more particularly to Figure 1, there is shown a circuit for detecting flame or predetermined high temperatures. A series of detecting devices 10 are connected in the circuit, as about to be described, each of which comprises a pair of circuit closing elements 11 and 11' each adapted to bridge a pair of contacts or terminals 12 and 14, and 12' and 14', respectively. The terminals 12 of the elements 11 are connected to one side or line 15 of the circuit, while the terminals 12' of the elements 11' are connected to the other side or line 16. The terminals 14 of the elements 11 and the terminals 14' of the elements 11' are connected to common terminal means or line 17 for the purpose to be described hereinafter.

The circuit closing elements 11 and 11' normally are held in open circuit position but are permitted to bridge their respective contacts in response to flame or high temperature. By providing a pair of circuit closing elements for each detecting device 10, arranged in series, both elements must bridge their contacts or terminals to close the circuit. This prevents premature operation of the detecting circuit in the event one of the circuit closing elements is permitted to bridge its contacts due to some mechanical defect.

Suitable thermo-responsive detecting devices adapted to be used in the circuit disclosed herein are illustrated in Patent Number 2,318,607, granted May 11, 1943.

A device 20 for testing the circuit, will first be described with reference to its electrical connections and its relation to the detecting circuit as shown in Figure 1. Generally, the device 20 comprises a pair of indicating devices, and a pair of switches so connected to each other and in the circuit that it is possible to determine whether or not the indicating devices are in working order, whether or not an element 11 or 11' is in its circuit closing position; or in the event one of the detecting devices has been operated due to flame or high temperature causing its elements 11 and 11' to close the circuit by connecting lines 15 and 16.

The indicating devices may be lamps 21 and 22 connected in parallel with respect to each other and in series with respect to the circuit between terminals 24 and 25. The switches 26 and 27 may be of the normally open circuit push button type, and are connected in series with respect to each other between terminals 25 and 29. The lamps and switches are operatively connected in the circuit by connecting one side of the detecting circuit or line 15 to the terminal 29, connecting the other side of the detecting circuit or line 16 to the terminal 25, and connecting the common line 17 of the detecting circuit between the switches 26 and 27 at 30. In order to provide a source of electrical energy and to complete the circuit, one pole of a battery 31 is connected to the terminal 24 and the other pole of the battery is connected to the terminal 29. If desired one pole of the battery may be grounded and terminal 24 or terminal 29 may be grounded.

In operating the testing device to determine whether or not the lamps are in working order, both switches 26 and 27 are closed simultaneously. Current will flow from one pole of the battery to the terminal 24, will divide and pass through the lamps to the terminal 25, will flow through the closed switches 26 and 27 to the terminal 29, and will return to the other pole of the battery. If the lamps are in working order, they will light. A defective lamp will not light and hence can be detected and replaced.

In order to detect that one of the elements 11 is in circuit closing position, the switch 27 is closed. Current will flow from one pole of the battery to the terminal 24, through the lamps to the terminal 25, through the switch 27 to the common line 17 and across the contacts 12 and 14 which are closed by their element 11, through the line 15 to the terminal 29, and to the other pole of the battery. Both lamps will light giving an indication that one of the elements 11 is in circuit closing position.

In order to detect that one of the elements 11' is in circuit closing position, the switch 26 is closed. Current will flow from one pole of the battery to the terminal 24, through the lamps to the terminal 25, through the line 16 and across the contacts 12' and 14' which are closed by their element 11', through the common line 17 to 30, through the switch 26 to terminal 29, and to the other pole of the battery. Both lamps will light giving an indication that one of the elements 11' is in circuit closing position.

In the event that an element 11 or 11' is found to be in circuit closing position it is placed in open circuit position or the faulty detecting device is replaced by one having its elements in proper open circuit position.

The foregoing tests usually are made preparatory to the flight of a plane or before sending a land vehicle, such as an armored tank, into action.

In addition to serving as a circuit testing device, the device 20 is adapted to indicate when a pair of elements 11 and 11' engage their respective contacts 12 and 14, and 12' and 14' and thereby close the detecting circuit. Should this occur, with both of the switches 26 and 27 open, current will flow from one pole of the battery to the terminal 24, through the lamps to the terminal 25, through the line 16 and across the elements 11 and 11' in circuit closing position to the line 15, through the line 15 to the terminal 29, and to the other pole of the battery. Both lamps will light automatically indicating that the detecting system has been operated.

It will be understood that operation of a fire extinguishing system or other emergency system could be effected automatically by the detecting circuit, or that upon automatic lighting of the lamps such a system could be operated manually.

In Figures 2, 3 and 4, a practical embodiment of a testing device 20 is illustrated. The device is in the form of a compact unit comprising a supporting member, such as a mounting plate 35; a unit 36 secured to the mounting plate having a pair of sockets 37 and 38 for the lamps 21 and 22, respectively, which extend outwardly through suitable openings in the mounting plate (Figure 3); and a unit 39 secured to the mounting plate and housing the switches 26 and 27 which are operated by push buttons 40 and 41, respectively, urged outwardly through suitable apertures in the mounting plate by resilient means 42 (Figure 3).

The switches, sockets and lamps are electrically connected by conductors in the manner illustrated in the wiring diagram, Figure 1, and more particularly as shown in Figure 4. For example, a conductor 45 connects the sockets 37 and 38, which are in electrical contact with one side of the lamps 21 and 22, respectively, to the terminal 24, and conductors 46 and 47 connect the other side of the lamps 21 and 22, respectively, to the terminal 25. The switches 26 and 27, respectively, close the circuit between the terminals 29 and 25 and a conductor 48 having the line 17 connected thereto at 30.

A box or casing 50, a section of which is removed in Figure 4, is secured to the back of the mounting plate 35 for housing the socket and switch units 36 and 39. If desired, the box 50 may be secured to the structure of the craft or vehicle on which the testing device 20 is used.

A suitable panel 51, preferably, is superimposed upon the front of the mounting plate and is detachably secured thereto. The panel is provided with apertures through which the push buttons 40 and 41 extend, and is provided with a protective casing portion 52 for housing the exposed ends of the lamps 21 and 22. By being detachably secured, the panel 51 may be readily removed to facilitate replacement of the lamps.

The panel 51, preferably, is formed of a translucent plastic molding composition of the cellulose acetate type or the like, so that the lamps, when illuminated, can be readily seen through the casing portion 52. If desired, the walls of the casing portion may be thinner than the other portions of the panel to render it more translucent. The panel can be readily molded and may be provided with suitable legend or indicia.

In Figure 5, a modified testing device 20' is illustrated which generally comprises a mounting plate 35'; a panel 51' on the front of the mounting plate, and sleeves 54 and 55 secured to the back of the mounting plate for facilitating compact assembly of push buttons, lamps, lamp sockets and switch contacts, as about to be described.

The sleeves 54 and 55 have assembled therewith lamp sockets 37' and 38' slidably mounted in the sleeves at the ends secured to the mounting plate 35'. Lamps 21' and 22' are mounted in the sockets and have one of their contacts 56 extending through the sockets. Suitable hollow cap-like push buttons 40' and 41' are secured to sockets 37' and 38', respectively, and extend outwardly from the front of the device through apertures provided in the mounting plate 35' and the panel 51'. The push buttons house the lamps and are formed of translucent material to permit the lamps to be seen therethrough when they are illuminated.

The contacts 56 of the lamps are engaged by one end of contact pins 57 and 57' slidably mounted in the sleeves. Preferably, one end of each of the pins is supported by a disc 58 and the other end of each of the pins is slidably supported in a bushing 59 secured in the corresponding sleeve 54 or 55. A spring 60 is mounted on each of the pins, intermediate the disc 58 and the bushing 59. These springs are adapted to urge the pins into contact with the contact 56 of the lamp. The ends of the sleeves opposite the ends secured to the mounting plate have bushings 61 secured therein supporting contact members 62 and 62', respectively.

The foregoing described elements are assembled in the sleeve 55, so that the pin 57' is adapted to engage the contact member 62' when the push button 41' is moved inwardly toward the sleeve 55, the pin 57' being moved toward the contact member by the contact 56 of the lamp 22' movable with the push button 41'.

In order to provide an electrical circuit, about to be described, the elements are assembled in the sleeve 54 so that the pin 57 does not contact the contact member 62 to close an electrical circuit. Preferably, the pin 57 moves or carries another member insulated from the pin which engages the contact member 62 to close a circuit. This may be accomplished by slidably mounting a second pin 65 in the sleeve 54 having one end supported by a disc 66 and having its other end slidably supported by a bushing 67 secured in the sleeve 54. The pin 65 is normally held out of engagement with the contact member 62 by a spring 69 mounted on the pin between the discs 66 and the bushing 67. The spring 69 urges the pin 65 toward the pin 57, but a disc 70 of insulating material prevents electrical contact between the pins 57 and 65. When the push button 40' is moved inwardly toward the sleeve 54, the lamp contact 56 moves the pin 57 which in turn moves the pin 65.

The device 20' is adapted to be electrically connected in a circuit corresponding to the circuit illustrated in Figure 1 and described in connection therewith. To accomplish this, the lamps 21' and 22' are connected in parallel between terminals 24' and 25' by connecting together one contact of each lamp and connecting together the pins 57 and 57' which are in electrical connection with the other contact 56 of the respective lamps. The terminal 24' has one side of a battery 31' connected thereto and the terminal 25' (which is in electrical connection with the pins 57 and 57') has a line 16' of the detecting circuit (not shown) connected thereto.

The pin 65 and the contact member 62 provide a switch 26', and the pin 57' and the contact member 62' provide a switch 27'. The switches 26' and 27' are connected in series by connecting the contact members 62 and 62'. The common line 17' of the detecting circuit is connected between the switches 26' and 27' at 30'. The line 15' of the detecting circuit is connected to the terminal 29' which is connected to the pin 65 and to the other side of the battery 31'.

The operation of the testing device 20' is substantially the same as the operation of the device 20 described herein. The lamps 21' and 22' may be tested by pushing the buttons 40' and 41' inwardly at the same time. This causes the pins 65 and 57' to engage their respective contact members 62 and 62' whereby the lamp circuit is closed, starting from one side of the battery 31' to the terminal 24', through the lamps to their contacts 56 which engage pins 57 and 57', through switches 27' and 26' to the pin 65, to terminal 29 and to the other side of the battery. If the lamps are in working order, they will both be illuminated.

In order to determine whether or not a circuit is closed between lines 15' and 17', the button 41' is pushed inwardly. In the event the circuit is closed between lines 15' and 17', a circuit will be completed through the lamps, starting from one side of the battery 31' to the terminal 24', through the lamps to the terminal 25', through switch 27', which is closed, to the line 17', and across to the line 15', connected to the other side of the battery by way of terminal 29'.

In order to determine whether or not a circuit is closed between lines 16' and 17', the button 40' is pushed inwardly. In the event the circuit is closed between lines 16' and 17', a circuit will be completed through the lamps, starting from one side of the battery 31' to the terminal 24', through the lamps to the terminal 25' and line 16', across to line 17', through switch 26', which is closed, to terminal 29' and back to the other side of the battery.

In the event electrical contact is established between lines 15' and 16', a circuit will be completed through the lamps, starting from one side of the battery 31' to the terminal 24', through the lamps to the terminal 25' and to line 16', across to line 15' to terminal 29', and back to the other side of the battery.

In view of the foregoing description, it will be seen that the present invention provides a simple testing device for an electrical circuit. The testing device is compact in arrangement and sturdy in construction and is readily used for testing a number of conditions which may exist in the circuit. In addition, the testing device serves as a visual alarm in the event the occurrence of an emergency sets off the detecting circuit. By combining the lamps with the push button assembly, the size and weight of the device may be further reduced.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention which, as a matter of language, might be said to fall therebetween.

We claim:
1. A device of the class described comprising a mounting plate, a panel mounted on said plate having a hollow translucent portion projecting outwardly at the front thereof and having an aperture therein, and a switch and lamp assembly mounted in back of said panel including a switch operating push button extending forwardly through the aperture of said panel and a socket in back of said hollow portion and in alignment therewith for mounting a lamp having a portion thereof disposed in said hollow portion whereby the lamp when illuminated is visible through said hollow portion.

2. A device according to claim 1, wherein the hollow portion is integrally formed with said panel and is of a reduced thickness.

3. A device of the class described comprising a mounting plate having a pair of apertures, a panel mounted in front of said plate having a hollow, translucent forwardly projecting portion in alignment with one of said plate apertures and having an aperture in alignment with the other of said plate apertures, and a switch and lamp assembly mounted in back of said plate including a switch operating push button extending forwardly through said aligned plate and panel apertures and including a socket in alignment with said hollow portion for mounting a lamp adapted to extend through said plate and into said hollow portion whereby the lamp when illuminated is visible through said hollow portion.

4. A device of the class described comprising a mounting plate, a panel mounted on said plate having a hollow translucent portion projecting outwardly at the front thereof and having a pair of apertures adjacent said portion, and a switch and lamp assembly including a pair of switch operating push buttons each extending forwardly through one of said panel apertures and including a pair of sockets for mounting lamps positioned to extend into said hollow portion, whereby the lamps when illuminated are visible through said hollow portion.

5. A device of the class described comprising a mounting plate having opening means and a pair of apertures adjacent said opening means, a panel formed of translucent material mounted in front of said plate having an integrally formed hollow forwardly projecting portion of reduced thickness positioned over said opening means and having a pair of apertures in alignment with said pair of plate apertures, and a switch and lamp assembly mounted in back of said plate including a pair of switch operating push buttons each extending forwardly through one of said aligned plate and panel apertures and including a pair of sockets for mounting lamps positioned to extend through said plate opening means and into said hollow portion, whereby the lamps when illuminated are visible through said hollow portion.

HARRY C. GRANT, Jr.
ARTHUR W. UHL.

REFERENCES CITED

The following references are of record in the file of this patent:

UNITED STATES PATENTS

| Number | Name | Date |
|---|---|---|
| 2,014,592 | Schwarze | Sept. 17, 1935 |
| 2,195,975 | Ribble et al. | Apr. 2, 1940 |
| 2,355,149 | De Giers | Aug. 8, 1944 |
| 2,448,026 | Grant | Aug. 31, 1948 |